United States Patent Office.

CHARLES H. FRINGS, OF CENTRETON, MISSOURI, ASSIGNOR TO HIMSELF AND CHARLES BRACHES, OF SAME PLACE.

Letters Patent No. 113,997, dated April 25, 1871.

IMPROVEMENT IN PREPARING AND MASHING GRAIN.

The Schedule referred to in these Letters Patent and making part of the same.

*To all whom it may concern:*

Be it known that I, CHARLES H. FRINGS, of Centreton, in the county of St. Louis and State of Missouri, have invented a new and useful Improvement in Preparing and Mashing Grain; and I do hereby declare that the following is a full, clear, and exact description thereof, which will enable others skilled in the art to make and use the same.

This invention relates to certain improvements on the process of treating grain, for which Letters Patent No. 109,887, were granted to me on the 6th day of December, 1870.

The object of the present invention is—

First, to withdraw from the grain, before mashing it, the proteine necessary for complete fermentation, and return it, after saccharization, to the mash;

Secondly, to set free, saccharify, and finally convert into alcohol all the starch contained in the grain;

Thirdly, to reduce the production, during the mashing and fermenting process, of lactic and acetic acid to an unimportant amount; and Finally, to improve the quality of alcohol and increase the value of the slop or swill as fodder.

It is well known that grain contains two ingredients equally valuable for alcohol production, to wit, starch and proteine.

However completely the starch may, during the mashing process, be converted into sugar, the full yield of alcohol cannot be obtained from it without complete fermentation.

In order to carry out such complete fermentation, an abundance of soluble proteine, (nitrogenous substances,) from which the yeast derives its nutriment, must be in the mash.

If the mash is made too hot, nearly the entire proteine contained in it will become ineffective; if not heated enough, not all the starch will be disclosed.

In order to carry out my invention in conformity with the stated objects, and with the view of overcoming the stated difficulties of the ordinary processes, I proceed as follows:

The grain, which may be rice, corn, rye, barley, wheat, or other cereal, is first pulverized, or if of a more horny consistency, like rice and certain kinds of corn, first steeped in an alkaline solution, containing for every bushel of grain one to one and a quarter ounce of caustic soda, or an equivalent quantity of caustic potash, and water enough to cover the grain.

After having been steeped for several hours, the horny parts will be sufficiently loose and the grain may, after having been superficially dried, be pulverized.

Grain less horny is first pulverized, and is then, in a suitable sieve or apparatus, separated from the larger (horny) parts. These are then separately moistened with an alkaline solution, like that used for the horny grain, and pulverized, after few hours, when sufficiently dry.

The next proceeding is to extract the proteine from the grain.

For this purpose the pulverized grain, whether the same has been treated in the aforesaid alkaline solution for loosening its horny parts or not, is steeped in another alkaline solution, which contains for every bushel of grain one to one and a quarter ounce of caustic soda, or its equivalent amount of caustic potash, and for every bushel of rice or corn about fifteen, for other grain about twenty, gallons of water.

The grain is stirred in this solution for about fifteen minutes, and then allowed to settle until about five gallons of the liquid above the sediment can be and are drawn for every bushel of grain.

This proteine extract is reserved for fermentation.

In order to prevent alkaline reaction, which in the mash promotes a disadvantageous formation of lactic acid, I now add to the sediment muriatic acid in such proportion that the mash will, after addition of proteine extract, show a sour reaction.

This inorganic acid aids in completing the disclosure of starch before saccharization, and promotes, in conjunction with the said alkaline bases, the effectivity of the diastase during saccharization, and the action of the proteine during fermentation.

It also improves the quality of the alcohol, prevents the formation of acetic acid, and increases, by forming salts, by its combination with the soda or potash, the value of the slop or swill as fodder.

From five to six ounces of muriatic acid for every bushel of grain, diluted in three times its bulk of water, are, while the sediment is being stirred, added to the same.

The mixture, after standing about fifteen minutes, can now be brought to the mash-tub. The tub should contain sufficient hot water that, after the addition of the grain, thirty gallons will be occupied by each bushel.

For rice and corn, the water in the tub should be about 212°, for other grain about 180° Fahrenheit.

Immediately after the application of the sediment to the tub, which causes a considerable reduction of temperature, one bushel of malt is added to every one hundred bushels of unmalted grain for the liquefaction of "paste" first formed.

The temperature is then gradually raised for rice and corn to 200°, for other grain to 170° Fahrenheit, and retained for about ten or fifteen minutes.

The temperature is then quickly reduced to about 145°, and the malt required for saccharization is added, whereof five bushels for every one hundred bushels of unmalted grain are required. The temperature is now for about one hour kept at 142° to 145°, after which time the process of saccharization is completed.

The protiene extract taken from the grain is added to the mash when the same has been cooled to about 120°.

Fermentation is finally effected, after further cooling, by the customary addition of yeast, and is completed in about thirty-six or forty hours.

Having thus described my invention,

I claim as new and desire to secure by Letters Patent—

1. The combined application of hydrate of soda or hydrate of potash and muriatic acid to grain, as specified.

2. The herein-described process of separating proteine from grain before mashing, and returning it to the mash after saccharization, for the purpose specified.

3. The process herein described of preparing and mashing grain, substantially as specified.

CHAS. H. FRINGS.

Witnesses:
GARHARD H. WINKELMEYER,
HENRY SCHIELER.